United States Patent
Takagi et al.

(10) Patent No.: US 8,764,889 B2
(45) Date of Patent: Jul. 1, 2014

(54) SILICA FILM FILTER AND PROCESS FOR PRODUCING SILICA FILM FILTER

(71) Applicant: NGK Insulators, Ltd., Nagoya (JP)

(72) Inventors: Mariko Takagi, Nagoya (JP); Kenichi Noda, Nagoya (JP); Nobuhiko Mori, Nagoya (JP); Masaaki Kawai, Nagoya (JP); Aya Satoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/727,974

(22) Filed: Dec. 27, 2012

(65) Prior Publication Data
US 2013/0112078 A1 May 9, 2013

Related U.S. Application Data

(63) Continuation of application No. PCT/JP2011/063967, filed on Jun. 17, 2011.

(30) Foreign Application Priority Data

Jul. 2, 2010 (JP) ................................ 2010-151852
Aug. 25, 2010 (JP) ................................ 2010-188468

(51) Int. Cl.
*B01D 53/22* (2006.01)

(52) U.S. Cl.
USPC .................. 96/11; 95/43; 95/45; 95/53; 96/4

(58) Field of Classification Search
CPC ..... B01D 53/228; B01D 71/022; C01B 3/505
USPC .................... 95/43, 45, 53; 96/4, 11
See application file for complete search history.

(56) References Cited

U.S. PATENT DOCUMENTS

| | | | |
|---|---|---|---|
| 5,104,425 A * | 4/1992 | Rao et al. .......................... 95/47 |
| 5,770,275 A * | 6/1998 | Raman et al. ................. 427/535 |
| 5,772,735 A * | 6/1998 | Sehgal et al. ..................... 95/45 |
| 6,818,333 B2 * | 11/2004 | Chau et al. .................... 428/702 |
| 7,014,680 B2 * | 3/2006 | Nakayama et al. ............... 95/51 |
| 7,938,894 B2 * | 5/2011 | Oyama et al. .................... 96/11 |
| 8,187,678 B2 * | 5/2012 | Jiang et al. .................... 427/535 |
| 2012/0018370 A1 * | 1/2012 | Takahashi et al. ............. 210/490 |

FOREIGN PATENT DOCUMENTS

| | | |
|---|---|---|
| JP | 06-170188 A1 | 6/1994 |
| JP | 10-249175 A1 | 9/1998 |
| JP | 10-323547 A1 | 12/1998 |
| JP | 2002-263457 A1 | 9/2002 |

(Continued)

OTHER PUBLICATIONS

Wen et al. "Organic/Inorganic Hybrid Network Materials by the Sol-Gel Approach" Chem. Mater: 1996,8,1667-1681.*

(Continued)

*Primary Examiner* — Jason M Greene
*Assistant Examiner* — Anthony Shumate
(74) *Attorney, Agent, or Firm* — Burr & Brown, PLLC

(57) ABSTRACT

There is provided a silica membrane filter having performance of selectively separating an aromatic compound and performance of selectively separating an alcohol. The silica membrane filter is provided with a porous substrate and a silica membrane. The ratio of a He gas permeation amount to an $N_2$ gas permeation amount (He gas permeation amount/$N_2$ gas permeation amount) is 7 or less, and the ratio of the $N_2$ gas permeation amount to a $SF_6$ gas permeation amount ($N_2$ gas permeation amount/$SF_6$ gas permeation amount) is 1.5 or more.

12 Claims, 1 Drawing Sheet

(56) References Cited

FOREIGN PATENT DOCUMENTS

| JP | 2002-292261 A1 | 10/2002 |
| JP | 2008-247654 A1 | 10/2008 |
| JP | 2009-189941 A1 | 8/2009 |
| JP | 2010-069432 A1 | 4/2010 |

OTHER PUBLICATIONS

Y. Ohshima, et al., "*New Pore Size Con a SiO$_2$ Membrane*," Key Engineering Materials, vols. 159-160, pp. 275-280.

G.D. West, et al "*Structural Characterisation of Organosiloxane Membranes,*" British Ceramic Transactions, vol. 102, No. 3, 2003, pp. 93-98.

Yudai Ohta, et al., "*Development of Pore Size-Controlled Silica Membranes for Gas Separation by Chemical Vapor Deposition.*" Journal of Membrane Science, 315, 2008, pp. 93-99.

Mikihiro Nomura, et al., "*Pore Size Control of a Molecular Sieve Silica Membrane Prepared by a Counter Diffusion CVD Method,*" Journal of Chemical Engineering of Japan, vol. 40, No. 13, 2007, pp. 1235-1241.

\* cited by examiner

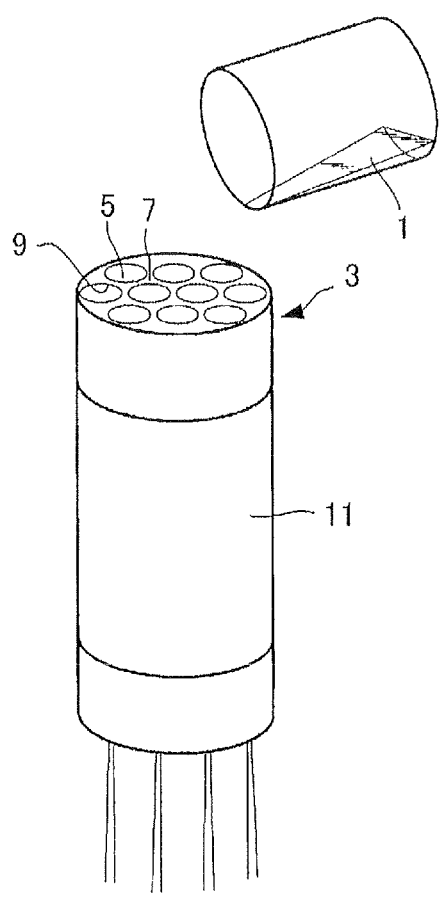

SILICA FILM FILTER AND PROCESS FOR PRODUCING SILICA FILM FILTER

This application is a continuation of International Application No. PCT/JP2011/063967, filed Jun. 17, 2011, which claims the benefit under §119(a)-(d) of Japanese Patent Application No. 2010-151852, filed Jul. 2, 2010, and Japanese Patent Application No. 2010-188468, filed Aug. 25, 2010.

TECHNICAL FIELD

The present invention relates to a silica membrane filter usable for separating or condensing only a specific kind of substances out of a fluid (liquid or gas) where several kinds of substances are mixed together and to a manufacturing method thereof.

BACKGROUND ART

Upon separation or condensation of only a specific kind of substances out of a fluid where several kinds of substances are mixed together, a separation membrane may be used.

The separation membrane has a structure having countless pores passing therethrough. Though various substances can generally be passed through the pores of the separation membrane, easiness of passing depends on the kind of substances. Therefore, in the case that substances easily passing through the pores of the separation membrane and substances hardly passing through the pores of the separation membrane are mixed together in substances contained in a fluid, by treating the fluid with the separation membrane, substances easily passing through the pores can pass through the separation membrane while substances hardly passing through the pores cannot pass through the separation membrane and remain as they are. Thus, treating a fluid with a separation membrane enables a specific kind of substances contained in the fluid to be separated or condensed.

A silica membrane is a porous membrane having countless pores passing therethrough. Generally, the pores of a silica membrane are characterized by easily passing substances having small molecular diameters (e.g., water and carbon dioxide). Using this characteristic, a silica membrane is used for the case of separating water from a mixed liquid of water and ethanol, the case of separating carbon dioxide from a combustion exhaust gas, or the like (e.g., Patent Documents 1 to 5 and Non-Patent Documents 1 to 4). On the other hand, the pores of a conventional silica membrane are characterized by hardly passing an aromatic compound and alcohol having relatively large molecular diameters.

PRIOR ART DOCUMENT

Patent Document

Patent Document 1: JP-A-2010-69432
Patent Document 2: JP-A-2009-189941
Patent Document 3: JP-A-10-249175
Patent Document 4: JP-A-10-323547
Patent Document 5: JP-A-6-170188

Non-Patent Document

Non-Patent Document 1: Y. Ohshima, et al., Key Eng. Mater., 159-160 (1999) 275-280.
Non-Patent Document 2: G. D. West, et al., British Ceramic Transaction, 102 (3) (2003) 93-98.
Non-Patent Document 3: K. Akamatsu, et al., J. Membrane Sci., 315 (2008) 93-99.
Non-Patent Document 4: M. Nomura, et al., J. Chem. Eng. Japan, 40(13) (2007) 1235-1241.

SUMMARY OF THE INVENTION

However, since a silica membrane is excellent in thermal resistance, chemical resistance, shock resistance, etc., it is demanded to become usable also in the case of separating an aromatic compound or an alcohol having relatively large molecular diameters.

In view of the aforementioned problem, the objective of the present invention is to provide a silica membrane filter having performance of selectively separating an aromatic compound and performance of selectively separating an alcohol and a method for manufacturing the filter.

The present invention is a silica membrane filter and a method for manufacturing the silica membrane filter described below.

[1] A silica membrane filter comprising a porous substrate and a silica membrane provided on a surface of the porous substrate, wherein the ratio of a He gas permeation amount to an $N_2$ gas permeation amount (He gas permeation amount/$N_2$ gas permeation amount) is 7 or less, and the ratio of the $N_2$ gas permeation amount to a $SF_6$ gas permeation amount ($N_2$ gas permeation amount/$SF_6$ gas permeation amount) is 1.5 or more.

[2] The silica membrane filter according to [1], wherein the ratio of the He gas permeation amount to the $N_2$ gas permeation amount (He gas permeation amount/$N_2$ gas permeation amount) is 1.0 to 2.6, and the ratio of the $N_2$ gas permeation amount to the $SF_6$ gas permeation amount ($N_2$ gas permeation amount/$SF_6$ gas permeation amount) is 1.5 to 10.

[3] The silica membrane filter according to [1] or [2], wherein the silica membrane contains an aryl group.

[4] The silica membrane filter according to [3], wherein the aryl group of the silica membrane is one of a phenyl group, a benzyl group, a tolyl group, and a xylyl group.

[5] The silica membrane filter according to [4], wherein the ratio of the $N_2$ gas permeation amount to the $SF_6$ gas permeation amount ($N_2$ gas permeation amount/$SF_6$ gas permeation amount) is 3.0 to 10.

[6] The silica membrane filter according to [1] or [2], wherein the silica membrane contains an alkyl group.

[7] The silica membrane filter according to [6], wherein the alkyl group has a carbon number of 2 to 8.

[8] The silica membrane filter according to [7], wherein the ratio of the $N_2$ gas permeation amount to the $SF_6$ gas permeation amount ($N_2$ gas permeation amount/$SF_6$ gas permeation amount) is 1.5 to 5.0.

[9] The silica membrane filter according to [1] or [2], which can be obtained by subjecting a precursor sol made of a silica raw material containing a silica compound containing an aryl group and/or an alkyl group to a thermal treatment.

[10] The silica membrane filter according to [9], wherein the silica compound contains an alkoxysilane containing an aryl group and/or an alkyl group.

[11] The silica membrane filter according to [9] or [10], wherein a part of the aryl group and/or the alkyl group derived from the silica compound is decomposed by the thermal treatment.

[12] The silica membrane filter according to [11], wherein 40 to 99% of the aryl group and/or the alkyl group derived from the silica compound is decomposed.

[13] The silica membrane filter according to any one of [1] to [12], wherein the $N_2$ gas permeation amount is $5.0\times10^{-9}$ mol/m²·Pa·s or more.

[14] A method for manufacturing a silica membrane filter comprising: a precursor solution preparation step of subjecting a silica compound to hydrolysis and polycondensation to obtain a precursor solution containing a precursor sol, a coating step of bringing the precursor solution into contact with a surface of a porous substrate and allowing the precursor sol contained in the precursor solution to adhere to the surface of the porous substrate by the flow of the precursor solution due to its own weight, and a drying and thermal treatment step of drying the precursor sol adhering to the surface of the porous substrate and then thermally treating the dried precursor sol at 300 to 600° C.

[15] The method for manufacturing a silica membrane filter according to [14], wherein a part of or all the silica compound is a silica compound containing an aryl group and/or an alkyl group.

[16] The method for manufacturing a silica membrane filter according to [15], wherein a part of or all the silica compound is an alkoxysilane containing an aryl group and/or an alkyl group.

A silica membrane filter of the present invention has performance of selectively separating an aromatic compound and performance of selectively separating an alcohol. A method for manufacturing a silica membrane filter of the present invention enables to obtain a silica membrane filter having performance of selectively separating an aromatic compound and performance of selectively separating an alcohol.

BRIEF DESCRIPTION OF THE DRAWING

FIG. 1 is a schematic view showing one embodiment of a coating step in a method for manufacturing a silica membrane of the present invention.

MODE FOR CARRYING OUT THE INVENTION

Hereinbelow, an embodiment of the present invention will be described with referring to drawing. The present invention is not limited to the following embodiment, and changes, modifications, and improvements may be made as long as they do not deviate from the scope of the present invention.

1. Silica Membrane:

A silica membrane filter of the present invention is provided with a porous substrate and a silica membrane provided on a surface of the porous substrate. Furthermore, in a silica membrane filter of the present invention, the ratio of a He gas permeation amount to an $N_2$ gas permeation amount (He gas permeation amount/$N_2$ gas permeation amount, hereinbelow referred to as a "He/$N_2$ ratio") is 7 or less, and the ratio of the $N_2$ gas permeation amount to a $SF_6$ gas permeation amount ($N_2$ gas permeation amount/$SF_6$ gas permeation amount, hereinbelow referred to as a "$N_2$/$SF_6$ ratio") is 1.5 or more.

A silica membrane filter of the present invention exhibits the ability to selectively separate an aromatic compound from a fluid containing the aromatic compound (e.g., benzene) and substances other than the aromatic compound (hereinbelow, aromatic series selection performance) and the ability to selectively separate an alcohol from a fluid containing the alcohol (e.g., ethanol) and substances other than the alcohol (hereinbelow, alcohol selection performance) when the He/$N_2$ ratio is 7 or less while the $N_2$/$SF_6$ ratio is 1.5 or more. Furthermore, in a silica membrane filter of the present invention, from the viewpoint of enhancement in the aromatic series selection performance and the alcohol selection performance, it is preferable that the He/$N_2$ ratio is 1.0 to 2.6 and that the $N_2$/$SF_6$ ratio is 1.5 to 10.

In a silica membrane filter of the present invention, when the He/$N_2$ ratio is 7 or less, the number of pores having a pore size smaller than about 0.4 nm becomes small, and the pores having a pore size of about 0.4 nm or more are mainly present.

Further, in a silica membrane filter of the present invention, when $N_2$/$SF_6$ ratio is 1.5 or more, the proportion of pores having a pore size of about 0.4 to about 0.6 nm increases. Since the pore size range of about 0.4 to about 0.6 nm overlaps the range of the molecular diameters of aromatic compounds and alcohols, the pores of a silica membrane filter of the present invention are suitable for aromatic compounds and alcohols to pass therethrough.

As a silica membrane filter of the present invention, when a silica membrane is provided on a surface of the porous substrate, the number of pores having a pore size of 1 nm or more, in particular, pores having a pore size of several nm or more in the silica membrane is very small. Therefore, a silica membrane filter of the present invention hardly allows substances having molecular diameters larger than those of aromatic compounds or those of alcohols to pass therethrough.

By providing a silica membrane on a surface of the porous substrate, strength of the silica membrane can be improved. A large number of pores pass through the porous substrate. Therefore, a fluid can pass through the porous substrate.

As a porous substrate used for a silica membrane filter of the present invention, it is desirable to use a porous substrate made of porous ceramics containing at least one kind of alumina, titania, silica, cordierite, zirconia, mullite, and the like as the main component. When alumina or the like listed above is the main component, the porous substrate becomes excellent in thermal resistance, chemical resistance, shock resistance, and the like.

In the porous substrate, from the viewpoint of raising the permeation flux of substances passing through a silica membrane and the viewpoint of completely filling the openings of the porous substrate with a silica membrane, it is preferable that pores having an average pore size of 0.001 to 5 μm are open at the surface of the portion where the silica membrane is provided.

In a silica membrane filter of the present invention, the porous substrate may have a single layer structure or a multilayer structure.

Though the shape of the porous substrate is not particularly limited, there can be mentioned, for example, a cylindrical (tubular) shape such as a circular cylindrical shape and a prismatic cylindrical shape, a columnar shape such as a circular columnar shape and a prismatic columnar shape, and a plate-like shape such as a circular plate-like shape and a polygonal plate-like shape. Since the ratio of the surface area of the silica membrane to the capacity of the silica membrane filter can be increased, a monolith shape can be mentioned as a preferable shape for the porous substrate. When the porous substrate has a monolith shape, it is preferable to provide a silica membrane on the inner wall surfaces of pores open in a lotus root fashion.

In addition, a silica membrane filter of the present invention, it is preferable to provide the silica membrane in the state that it does not enter the pores deeply from the surface of the porous substrate from the viewpoint of increasing the permeation flux of the substances passing through the silica membrane.

In a silica membrane filter of the present invention, it is preferable to obtain the silica membrane by preparing a precursor sol by subjecting a silica compound to hydrolysis and polycondensation and then forming the precursor sol into a membrane shape, followed by a thermal treatment. Here, in the raw material for preparing the precursor sol, substances other than the silica compound may be contained, and, for example, a metal element other than silicon may be contained.

The silica compound mentioned in the present specification means a compound containing one or two or more of silicon atoms (Si) in the molecular structure.

In addition, a silica membrane filter of the present invention, the silica membrane may contain an aryl group. Here, as the aryl group, there can be mentioned a phenyl group, a benzyl group, a tolyl group, a xylyl group, a naphthyl group, a styryl group, a phenoxy group, an anisyl group, and the like. In a silica membrane filter of the present invention, the silica membrane may contain only one kind of the aryl group or two or more kinds of the aryl group.

In a silica membrane filter of the present invention, in the case of using a silica compound containing an aryl group in a part of or all the silica compounds upon preparing a precursor sol, a silica membrane containing the aryl group can be obtained.

Here, as the silica compound containing an aryl group, an alkoxysilane can be used. As the alkoxysilane, there can be used, for example, phenyltrimethoxysilane, phenyltriethoxysilane, diphenyldimethoxysilane, diphenyldiethoxysilane, paratolyltrimethoxysilane, orthotolyltrimethoxysilane, methatolyltrimethoxysilane, paraxylyitrimethoxysilane, orthoxylylmethoxysilane, and methaxylyltrimethoxysilane.

For example, by subjecting phenyltrimethoxysilane to hydrolysis and polycondensation, the precursor sol having the structure shown by the following formula (1) can be prepared.

[Formula 1]

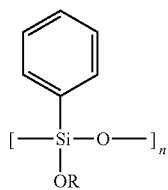

(1)

(In the formula (1), OR denotes a hydroxyl group or a methoxy group.)

In a silica membrane filter of the present invention, in the case that the silica membrane contains an aryl group, from the viewpoint of enhancing the aromatic series selection performance and the alcohol selection performance, it is preferable that the He/$N_2$ ratio is 1.0 to 2.6 and that $N_2$/$SF_6$ ratio is 1.5 to 10, and it is more preferable that the He/$N_2$ ratio is 1.0 to 2.6 and that the $N_2$/$SF_6$ ratio is 3.0 to 10.

In a silica membrane filter of the present invention, the silica membrane may contain an alkyl group. Here, in an alkyl group the silica membrane contains, the carbon number of the alkyl group is preferably 2 to 8 from the viewpoint of enhancing the aromatic series selection performance and the alcohol selection performance.

In a silica membrane filter of the present invention, in the case of using a silica compound containing an alkyl group in apart of or all the silica compounds upon preparing a precursor sol, a silica membrane containing the alkyl group can be obtained.

Here, as the silica compound containing an alkyl group, an alkoxysilane can be used. As the alkoxysilane, there can be used, for example, methyltrimethoxysilane, methyltriethoxysilane, dimethoxydimethylsilane, trimethylmethoxysilane, ethyltrimethoxysilane, propyltrymethoxysilane, butyltrimethoxysilane, pentyltrimethoxysilane, hexyltrimethoxysilane, heptyltrimethoxysilane, and octyltrimethoxysilane.

In a silica membrane filter of the present invention, in the case that the silica membrane contains an alkyl group, from the viewpoint of enhancing the aromatic series selection performance and the alcohol selection performance, it is preferable that the He/$N_2$ ratio is 1.0 to 2.6 and that $N_2$/$SF_6$ ratio is 1.5 to 10, it is more preferable that the He/$N_2$ ratio is 1.0 to 2.6 and that the $N_2$/$SF_6$ ratio is 1.5 to 5.0.

In a silica membrane filter of the present invention, the silica membrane may contain an aryl group and an alkyl group. For example, in the case of using a silica compound containing an alkyl group and a silica compound containing an alkyl group for the silica compound functioning as a raw material for the precursor sol, a silica membrane containing the aryl group and the alkyl group can be obtained.

In a silica membrane filter of the present invention, in the case that the silica membrane contains an aryl group or an alkyl group, from the viewpoint of enhancing the aromatic series selection performance and the alcohol selection performance, it is preferable that the silica membrane is obtained by preparing a precursor sol by subjecting a silica compound containing an aryl group or an alkyl group to hydrolysis and polycondensation and then subjecting the precursor sol to a thermal treatment. Further, in this case, it is preferable that the silica membrane is obtained by decomposing a part of the aryl group or the alkyl group contained in the precursor sol by the thermal treatment.

Further, in a silica membrane filter of the present invention, from the viewpoint of enhancing the aromatic series selection performance and the alcohol selection performance, it is preferable that the silica membrane is obtained by decomposing 40 to 99% of the aryl group or the alkyl group in the precursor sol upon thermally treating the precursor sol prepared by subjecting the silica compound to hydrolysis and polycondensation.

In a silica membrane filter of the present invention, in the case that a part of the aryl group or the alkyl group remains in the silica membrane even by the aforementioned thermal treatment (100% of the aryl group or the alkyl group is not decomposed by the aforementioned thermal treatment), the silica membrane becomes hydrophobic. As a result, since the silica membrane hardly adsorbs water vapor, the silica membrane has improved durability against water vapor.

It is speculated that the silica membrane obtained by preparing a precursor sol from a silica compound containing an aryl group or an alkyl group and then thermally treating the precursor sol as the aforementioned embodiment of a silica membrane filter of the present invention comes to have aromatic series selection performance and alcohol selection performance by the following principle.

By subjecting silica compounds to hydrolysis and polycondensation upon manufacturing a precursor sol, silica compounds bond one after another to form a chain where structural units derived from the silica compounds are lined. This chain is formed with occasionally branching. As a result, the chain where structural units derived from the silica compounds are lined forms a mesh structure. The meshes of the mesh structure serve as a prototype of the pores. When the silica compounds bond to form a mesh structure, it is speculated that the aryl group or the alkyl group functions as an obstacle in a three-dimensional structure to inhibit formation of small meshes and that the aryl group or the alkyl group functions to control the angle at which a chain intersects with another chain to a predetermined angle. It is speculated that, by such functions of the aryl group or the alkyl group, the size and the shape of the meshes functioning as a prototype of the pores come to be suitable for passing an aromatic compound or an alcohol therethrough.

By thermally treating the precursor sol prepared in this manner, the aforementioned meshes of the mesh structure become pores. By this thermal treatment, a part of an aryl group or a part of an alkyl group contained in the precursor sol is decomposed. In particular, it is speculated that, when the aryl group or the alkyl group present inside the meshes serving as the prototype of the pores is decomposed, a space is formed in a place which the aryl group or the alkyl group would occupy if they had not been decomposed to make large pores. Alternatively, it is speculated that the shape of the pores is changed due to the decomposition of the aryl group or the alkyl group. It is speculated that, by the changes in the size and the shape, the pores become more suitable for passing an aromatic compound or an alcohol. If a part of the aryl group or the alkyl group remains when a silica membrane is formed from the precursor sol, it is speculated that the affinity of the inner walls of the pores with an aromatic compound (e.g., benzene) or an alcohol (e.g., ethanol) becomes suitable for passing an aromatic compound or an alcohol through the pores.

In a silica membrane filter of the present invention, the $N_2$ gas permeation amount is preferably $5.0 \times 10^{-9}$ mol/m²·Pa·s or more. In this case, the permeation flux of a fluid becomes larger.

2. Method for Manufacturing Silica Membrane Filter:

A method for manufacturing a silica membrane filter of the present invention has a precursor solution preparation step of subjecting a silica compound to hydrolysis and polycondensation with stirring a raw material containing a silica compound, an organic solvent, and water to obtain a precursor solution containing a precursor sol at 40 to 150° C., a coating step of bringing the precursor solution into contact with a surface of the porous substrate and allowing the precursor sol to adhere to the surface of the porous substrate by the flow of the precursor solution due to its own weight, and a drying and thermal treatment step of drying the precursor sol adhering to the surface of the porous substrate and then thermally treating the dried precursor sol at 300 to 600° C.

In the precursor solution preparation step, by subjecting a silica compound to hydrolysis and polycondensation with stirring the raw material at 40 to 150° C., polymerization of the silica compound is accelerated, and thereby a precursor sol having a size appropriate for membrane formation can be obtained. By adjusting the temperature of the raw material and the time for stirring the raw material upon stirring the raw material, the size of the precursor sol can be adjusted. When the precursor sol is large, in the next coating step, the precursor sol hardly enters the pores from the surface of the porous substrate. As a result, the thickness of the silica membrane entering in the pores from the surface of the porous substrate can be reduced. Therefore, the use of a large precursor sol enables to produce a thin silica membrane. Thinning the silica membrane enables to increase the permeation flux upon passing a substance through the silica membrane.

As the organic solvent which can be used for a method for manufacturing a silica membrane filter of the present invention, there can be mentioned alcohols, ethers, ketones, amides, aromatics, and the like, which are miscible with a silica raw material and water. For example, there can be mentioned ethanol, isopropanol, and N-methyl-2pyrrolidone.

In a method for manufacturing a silica membrane filter of the present invention, it is preferable that the precursor solution contains a catalyst in order to accelerate hydrolysis of the silica compound. As the catalyst used here, there can be mentioned an acid catalyst or an alkali catalyst. Specifically, as the acid catalyst, for example, nitric acid, hydrochloric acid, sulfuric acid, phosphoric acid, and acetic acid can be used. As the alkali catalyst, there can be used, for example, sodium hydroxide, potassium hydroxide, and ammonia.

In a method for manufacturing a silica membrane filter of the present invention, the raw material for the precursor solution can be prepared by, for example, mixing phenyltrimethoxysilane (silica compound) and ethanol (organic solvent) together in the first place and stirring the mixture and then mixing an acid catalyst and water together and stirring the mixture.

In a method for manufacturing a silica membrane filter of the present invention, in the coating step, the precursor sol contained in the precursor solution is allowed to adhere to the surface of the porous substrate by the flow of the precursor solution due to its own weight (this coating method is hereinbelow referred to as a flow-down method). In the case of allowing the precursor sol to adhere to the porous substrate by the flow-down method, the pores of the porous substrate are clogged with the precursor sol in a short period of time while the precursor sol receives appropriate stress in comparison with the case of allowing the precursor sot to adhere by a dipping method or a spin coating method described later. As a result, the silica membrane becomes thin, and the pore size becomes suitable for exhibiting the aromatic series selection performance and the alcohol selection performance.

When the precursor sol is allowed to adhere to the porous substrate by a dipping method, since the precursor sol freely enters the pores of the porous substrate in comparison with the case of the flow-down method, the silica membrane becomes thick, and the precursor sol is filled into the pores of the porous substrate excessively. Therefore, the pore size of the silica membrane tends to be slightly smaller than the size suitable for exhibiting the aromatic series selection performance and the alcohol selection performance. When the adhesion amount of the precursor sol is reduced in order to thin the silica membrane, the pores of the porous substrate cannot be clogged completely, and the tendency of generating pores having a size of several nm or more in the silica membrane becomes high. Such pores having a size of several nm or more serve as a defect of passing unintended substances.

In the case of allowing the precursor sol to adhere to the porous substrate by a spin coating method, it is possible to thin the silica membrane in the same manner as in the case of the flow-down method. However, in the case of the spin coating method, since the precursor sol is densely filled into the pores of the porous substrate due to excessive stress upon rotation, the pore size of the silica membrane tends to be smaller than the size suitable for exhibiting the aromatic series selection performance and the alcohol selection performance like the dipping method. Here, when the rotation frequency is reduced in order to reduce stress upon rotation, the silica membrane tends to be thick. In addition, since the pores of the porous substrate cannot be clogged completely when the rotation frequency is reduced, holes having a size of several nm tend to be generated in the silica membrane. Such pores having a size of several nm or more serve as a defect of passing unintended substances.

Even in the case of forming a silica membrane not by a sol-gel method, but by a gas phase method such as a CVD method, the silica raw material freely enters the pores of the porous substrate in comparison with the case of the flow-down method, and therefore silica is excessively filled into the pores of the porous substrate. As a result, the pore size of the silica membrane tends to be smaller than the size suitable for exhibiting the aromatic series selection performance and the alcohol selection performance.

FIG. 1 is a view schematically showing an example of the flow-down method. Prior to the precursor sol-coating step, the outer peripheral surface of the porous substrate 3 is masked with a masking tape 11. Then, as illustrated, the porous substrate 3 is held in such a manner that the direction where cells 5 pass through matches the vertical direction, and the precursor solution 1 is pored into the cells 5 from the upper side end face of the porous substrate.

At this time, in the first place, the precursor sol contained in the precursor solution 1 adheres to the inner wall surfaces 9 of the cells 5 in the vicinity of the upper side end face of the porous substrate 3. Subsequently, the precursor sol flows down due to its own weight while adhering to the inner wall surfaces 9, thereby covering the inner wall surfaces 9 in a membrane fashion while spreading from the upper side to the lower side. When the precursor sol completely covers the inner wall surfaces 9 to the lower side end face, the precursor sol which cannot adhere to the inner wall surfaces 9 is discharged outside the cells 5 from the lower side end face of the porous substrate 3.

According to the flow-down method, the precursor sol hardly enters the pores of the porous substrate 5, and an excessive amount of precursor sol hardly adheres to the inner wall surfaces 9. As a result, a thin membrane of the precursor sol can be formed on the inner wall surfaces 9. When the thin membrane of the precursor sol is thus formed, a silica membrane filter having high permeation flux can be obtained.

In addition, by drying the precursor sol adhering to the surface of the porous substrate and then thermally treating it at 300 to 600° C., a part of the aryl group or the alkyl group derived from the silica compound can be decomposed. As a result, there can be obtained a silica membrane having high aromatic series selection performance or alcohol selection performance. When the thermal treatment temperature is 300° C. or more, decomposition of the aryl group or the alkyl group is caused to easily form pores suitable for passing an aromatic compound or an alcohol. When the thermal treatment temperature is 600° C. or less, the aryl group or the alkyl group is hardly decomposed completely, and affinity of the inner walls of the pores with an aromatic compound or an alcohol becomes suitable for passing an aromatic compound or an alcohol through the pores. Incidentally, the thermal treatment step can be performed in an ambient atmosphere, an inert gas, vacuum, or the like.

In addition, in a method for manufacturing a silica membrane filter of the present invention, each of the coating step and the drying and thermal treatment step is not limited to once. Since only the state that the pores of the porous substrate are clogged with the silica membrane is required, it is possible to gradually fill the pores of the porous substrate with the precursor sol by repeating the coating step or by repeating both the coating step and the drying and thermal treatment step to finally obtain the state where the pores of the porous substrate are completely clogged. By performing the coating step several times, the amount of the precursor solution to be used in one coating step can be reduced. As a result, since the amount of the precursor sol flowing down along the surface of the porous substrate is reduced, the precursor sol can be inhibited from excessively entering the pores.

EXAMPLE

Hereinbelow, the present invention will be described in more detail on the basis of Examples. However, the present invention is not limited to these Examples.

(1) Manufacturing of Silica Membrane Filter

Example 1

Phenyltrimethoxysilane and ethanol were mixed together and stirred at 4° C. to obtain a mixed solution where phenyltrimethoxysilane and ethanol were sufficiently mixed. The mixed solution were measured with a commercially available glass electrode type pH meter with KCl as a standard solution, and pH of 3.0 was shown. Next, for hydrolysis, a nitric acid aqueous solution was added little by little. After the nitric acid aqueous solution was added until the pH meter showed pH of 0.5, it was stirred at 4° C. for one hour. Next, the mixed solution obtained was stirred at 50° C. for three hours. Then, ethanol was added to dilute the whole so that the silica sol concentration might become 2.0 mass % in terms of $SiO_2$ to obtain a precursor solution. The precursor solution of 160 ml was taken out, and, by the method shown in FIG. 1, the precursor solution was allowed to flow down through the cells from the top of the monolith-shaped ceramic substrate having a diameter of 30 mm, a length of 160 mm, and glass sealing both the end portions to allow the precursor sol to adhere to the inner wall surfaces of the cells. Subsequently, after the precursor sol was dried, the monolith-shaped ceramic substrate having the precursor sol adhering thereto was thermally treated at 400° C. for one hour. The steps from the aforementioned coating of the precursor sol to the thermal treatment were repeated 3 to 6 times to confirm the state where the pores of the monolith-shaped ceramic substrate were clogged with the silica membrane in the inner wall surfaces of the monolith-shaped ceramic substrate.

Example 2

A silica membrane filter was manufactured in the same manner as in Example 1 except that the thermal treatment was performed at 300° C.

Example 3

A silica membrane filter was manufactured in the same manner as in Example 1 except that the thermal treatment was performed at 425° C.

Example 4

A silica membrane filter was manufactured in the same manner as in Example 1 except that paratolyltrimethoxysilane was used in place of phenyltrimethoxysilane.

Example 5

A silica membrane filter was manufactured in the same manner as in Example 1 except that benzyltrimethoxysilane was used in place of phenyltrimethoxysilane.

Example 6

A silica membrane filter was manufactured in the same manner as in Example 1 except that naphthalyltrimethoxysilane was used in place of phenyltrimethoxysilane.

Example 7

A silica membrane filter was manufactured in the same manner as in Example 1 except that diphenyltrimethoxysilane was used in place of phenyltrimethoxysilane.

Example 8

A silica membrane filter was manufactured in the same manner as in Example 3 except that phenyltriethoxysilane was used in place of phenyltrimethoxysilane.

Example 9

A silica membrane filter was manufactured in the same manner as in Example 1 except that ethyltrimethoxysilane was used in place of phenyltrimethoxysilane.

Example 10

A silica membrane filter was manufactured in the same manner as in Example 3 except that ethyltrimethoxysilane was used in place of phenyltrimethoxysilane.

Example 11

A silica membrane filter was manufactured in the same manner as in Example 1 except that octyltrimethoxysilane was used in place of phenyltrimethoxysilane.

Example 12

A silica membrane filter was manufactured in the same manner as in Example 3 except that octyltrimethoxysilane was used in place of phenyltrimethoxysilane.

Example 13

A silica membrane filter was manufactured in the same manner as in Example 3 except that octyltriethoxysilane was used in place of phenyltrimethoxysilane.

Comparative Example 1

A silica membrane filter was manufactured in the same manner as in Example 1 except that the precursor sol was prepared by performing hydrolysis and polycondensation of phenyltrimethoxysilane at room temperature (25° C.).

Comparative Example 2

A silica membrane filter was manufactured in the same manner as in Example 1 except that the precursor sol was allowed to adhere to the surface of the porous alumina support by a dipping method.

Comparative Example 3

A silica membrane filter was manufactured in the same manner as in Example 1 except that the thermal treatment was performed at 200° C.

Comparative Example 4

A silica membrane filter was manufactured in the same manner as in Example 1 except that tetraethoxysilane was used in place of phenyltrimethoxysilane.

(2) Gas Permeation Test

The silica membrane filters of Examples 1 to 13 and Comparative Examples 1 to 4 were subjected to a gas permeation test regarding He gas (the component is only He), $N_2$ gas (the component is only $N_2$), and $SF_6$ gas (the component is only $SF_6$). The gas permeation test was performed with maintaining the temperature of the silica membrane filter and the He gas and the like supplied to the silica membrane filter at room temperature (25° C.). The He gas, $N_2$ gas, and $SF_6$ gas were supplied to a silica membrane filter in a state of appropriately applying a fixed pressure in the range from 0.01 MPa (G) to 5 MPa (G). The gas permeation amounts of these three kinds of gas are shown in Table 1. In addition, the values of the He/$N_2$ ratios and the values of the $N_2$/$SF_6$ ratios calculated from the gas permeation amounts are shown in Table 1.

TABLE 1

| | Gas permeation amount (nmol/m² · Pa · s) | | | Gas permeation amount ratio | |
|---|---|---|---|---|---|
| | He | $N_2$ | $SF_6$ | Ne/$N_2$ ratio | $N_2$/$SF_6$ ratio |
| Example 1 | 280 | 140 | 19 | 1.9 | 7.5 |
| Example 2 | 400 | 65 | 22 | 6.2 | 2.9 |
| Example 3 | 673 | 429 | 75 | 1.6 | 5.7 |
| Example 4 | 478 | 233 | 74 | 2.1 | 3.1 |
| Example 5 | 134 | 32 | 3.1 | 4.2 | 10.3 |
| Example 6 | 315 | 126 | 13 | 2.5 | 9.7 |
| Example 7 | 1219 | 762 | 69 | 1.6 | 11.0 |
| Example 8 | 1342 | 583 | 201 | 2.3 | 2.9 |
| Example 9 | 1010 | 568 | 177 | 1.8 | 3.2 |
| Example 10 | 1439 | 514 | 101 | 2.8 | 5.1 |
| Example 11 | 2026 | 1342 | 925 | 1.5 | 1.5 |
| Example 12 | 1376 | 1363 | 303 | 1.0 | 4.5 |
| Example 13 | 1410 | 783 | 151 | 1.8 | 5.2 |
| Comp. Ex. 1 | 180 | 164 | 117 | 1.1 | 1.4 |
| Comp. Ex. 2 | 56 | 4.3 | 2.5 | 13.0 | 1.7 |
| Comp. Ex. 3 | 157 | 77 | 55 | 2.0 | 1.4 |
| Comp. Ex. 4 | 89 | 11 | 5.8 | 7.8 | 2.0 |

(3) Measurement of Decomposition Amount of Aryl Group and Alkyl Group

Regarding the silica membranes of Examples 1 to 13 and Comparative Examples 1 to 4, measurement according to infrared spectroscopy was performed at the time before the thermal treatment and at the time after the thermal treatment. In any of infrared absorption spectra of the silica membranes of the Examples 1 to 13 and Comparative Examples 1 to 3, an absorption peak derived from ring stretching vibrations and out-of plane bending vibrations of the aromatic ring derived from an aryl group or an absorption peak derived from an alkyl group were present at the time before the thermal treatment while, at the time after thermal treatment, the intensity of the adsorption peak became low in comparison with that at the time before the thermal treatment through these peaks were present. From this result, it was found out that a part of the aryl group or the alkyl group in the silica membrane was decomposed by the thermal treatment step. Incidentally, regarding the silica membrane of Comparative Example 4, no absorption peak derived from the aromatic ring was observed.

Regarding the silica membranes of Examples 1 to 13 and Comparative Examples 1 to 3, gas generated upon the thermal treatment was analyzed with a gas chromatograph mass analyzer. As a result, a signal derived from decomposition of an aryl group or an alkyl group was detected.

Regarding the silica membrane filters of Examples 1 to 13 and Comparative Examples 1 to 3, the mass of the aryl group and/or the alkyl group decomposed by the thermal treatment was calculated from the difference between the mass of the aryl group and/or the alkyl group contained in the membrane-shaped precursor sol before thermal treatment and the mass of the aryl group and/or the alkyl group contained in the silica membrane after the thermal treatment. Further, the decomposition rate of the aryl group and/or the alkyl group [(mass of the aryl group decomposed by the thermal treatment+mass of the alkyl group decomposed by the thermal treatment)/(mass of the aryl group contained in the precursor sol+mass of the alkyl group contained in the precursor sol)×100] was calculated. Here, the mass of the aryl group and/or the alkyl group contained in the membrane-shaped precursor sol before the thermal treatment was determined as the mass corresponding to the reduction of the mass during thermally treating the precursor sol at 800° C. in the atmosphere until no mass reduction was confirmed. The mass of the aryl group and/or the alkyl group decomposed by the thermal treatment was determined as the difference between the mass of the silica membrane after the thermal treatment and the mass of the silica membrane after the thermal treatment performed at 800° C. in the atmosphere until no mass reduction was confirmed. The results are shown in Table 2.

TABLE 2

| | Decomposition rate of aryl group and alkyl group (mass %) |
|---|---|
| Example 1 | 63.4 |
| Example 2 | 42.6 |
| Example 3 | 91.0 |
| Example 4 | 61.3 |
| Example 5 | 40.3 |
| Example 6 | 40.1 |
| Example 7 | 75.3 |
| Example 8 | 66.4 |
| Example 9 | 95.2 |
| Example 10 | 98.3 |
| Example 11 | 92.3 |
| Example 12 | 96.9 |
| Example 13 | 89.9 |
| Comp. Ex. 1 | 64.8 |
| Comp. Ex. 2 | 61.6 |
| Comp. Ex. 3 | 12.1 |

(4) Pervaporation Test of Benzene/Cyclohexane Base

Regarding the silica membrane filters of Examples 1 to 4 and 8 and Comparative Examples of 1 to 4, a pervaporation test of benzene/cyclohexane was performed. A mixed liquid of benzene and cyclohexane [benzene:cyclohexane=50:50 (mass ratio)] having a temperature of 50° C. was sent into the cells of the silica membrane filter, pressure was reduced with a degree of vacuum of about 10 Torr from the substrate side face, and the permeated vapor from the substrate side face was collected by a trap cooled with liquid nitrogen. The total permeation flux was calculated from the mass of the liquefied permeated vapor trapped above. The liquefied permeated vapor was analyzed by gas chromatography to determine the composition of the permeated vapor. The test results are shown in Table 3.

TABLE 3

| | Total permeation flux | Permeation liquid composition (mass %) | |
|---|---|---|---|
| | (kg/m$^2$ · h) | Benzene | Cyclohexane |
| Example 1 | 3.62 | 76.0 | 24.0 |
| Example 2 | 1.21 | 70.2 | 29.8 |
| Example 3 | 3.74 | 73.5 | 26.5 |
| Example 4 | 2.51 | 75.0 | 25.0 |
| Example 8 | 3.56 | 75.8 | 24.2 |
| Comp. Ex. 1 | Unmeasurable | Unmeasurable | Unmeasurable |
| Comp. Ex. 2 | 0.27 | 51.9 | 48.1 |
| Comp. Ex. 3 | 3.75 | 55.4 | 44.6 |
| Comp. Ex. 4 | 0.48 | 48.7 | 51.3 |

It was found out that each of the silica membrane filters of Examples 1 to 4 and 8 had a He/N$_2$ ratio of 7 or less and an N$_2$/SF$_6$ ratio of 1.5 or more, high permeation flux (large amount of fluid passed through the membrane of a unit area per unit time), and a performance of selectively separating benzene out of a liquid where benzene and cyclohexane were mixed together. Further, it was found out that, when the He/N$_2$ ratio was 1.0 to 2.6 and the N$_2$/SF$_6$ ratio was 1.5 to 10, the benzene permeation flux was higher. On the other hand, in the silica membrane filter of Comparative Example 1, since the mixed liquid supplied to the supply side leaked out on the discharge side, the pervaporation test could not be performed. The silica membrane filters of Comparative Examples 2 to 4 did not exhibit the performance of selectively separating benzene.

(5) Pervaporation Test of Ethanol/o-Xylene/n-Octane Base

Regarding the silica membrane filters of Examples 1 to 13 and Comparative Examples of 1 and 4, a pervaporation test of ethanol/o-xylene/n-octane was performed. A mixed liquid of ethanol, o-xylene, and n-octane [ethanol:o-xylene:n-octane=33:33:33 (mass ratio)] having a temperature of 50° C. was sent into the cells of the silica membrane filter, pressure was reduced with a degree of vacuum of about 10 Torr from the substrate side face, and the permeated vapor from the substrate side face was collected by a trap cooled with liquid nitrogen. The total permeation flux was calculated from the mass of the liquefied permeated vapor trapped above. The liquefied permeated vapor was analyzed by gas chromatography to determine the composition of the permeated vapor. The details of the test results are shown in Table 4.

TABLE 4

| | Total permeation flux | Permeation liquid composition (mass %) | | |
|---|---|---|---|---|
| | (kg/m$^2$ · h) | ethanol | o-xylene | n-octane |
| Example 1 | 2.83 | 64.1 | 20.2 | 15.7 |
| Example 2 | 0.98 | 58.3 | 30.5 | 11.2 |
| Example 3 | 3.82 | 79.1 | 13.8 | 7.0 |
| Example 4 | 2.68 | 98.1 | 12.0 | 0.7 |
| Example 5 | 0.18 | 72.3 | 17.1 | 10.6 |
| Example 6 | 2.45 | 82.1 | 10.6 | 7.3 |
| Example 7 | 0.45 | 74.2 | 12.6 | 13.2 |
| Example 8 | 1.70 | 82.3 | 12.5 | 5.2 |
| Example 9 | 2.03 | 94.1 | 3.0 | 2.9 |
| Example 10 | 0.57 | 89.8 | 5.2 | 5.0 |
| Example 11 | 2.75 | 96.6 | 2.1 | 1.2 |
| Example 12 | 2.87 | 95.0 | 2.8 | 2.2 |
| Example 13 | 1.80 | 93.3 | 4.7 | 2.0 |

TABLE 4-continued

| | Total permeation flux | Permeation liquid composition (mass %) | | |
|---|---|---|---|---|
| | (kg/m² · h) | ethanol | o-xylene | n-octane |
| Comp. Ex. 1 | Unmeasurable | Unmeasurable | Unmeasurable | Unmeasurable |
| Comp. Ex. 4 | 0.14 | 38.0 | 32.1 | 29.9 |

Each of the silica membrane filters of Examples 1 to 13 had a $He/N_2$ ratio of 7 or less and an $N_2/SF_6$ ratio of 1.5 or more, high permeation flux, and a performance of selectively separating ethanol from the fluid where ethanol, o-xylene, and n-octane were mixed together.

Among the silica membrane filters of Examples 1 to 13, when the $He/N_2$ ratio was 1.0 to 2.6 while the $N_2/SF_6$ ratio was 1.5 to 10 (Examples 1, 3, 4, 6, 8, 9, 11, 12, 13), the permeation flux was higher, and they had excellent performance of selectively separating ethanol from the fluid where ethanol, o-xylene, and n-octane were mixed together.

Examples 1 to 8 are silica membrane filters each provided with a silica membrane containing an aryl group (hereinbelow referred to as an aryl group-containing silica membrane filter). Examples 9 to 13 are silica membrane filters each provided with a silica membrane containing an alkyl group (hereinbelow referred to as an alkyl group-containing silica membrane filter). In these aryl group-containing silica membrane filters and alkyl group-containing silica membrane filters, there was recognized a correlation between the $He/N_2$ ratio and $N_2/SF_6$ ratio and the ethanol permeation flux and performance of selectively separating ethanol. The correlation was different between the aryl group-containing silica membrane filters and the alkyl group-containing silica membrane filters.

(Aryl Group-Containing Silica Membrane Filter)

From the comparison between Examples 1, 3, 4, 6 and Example 8, it was found out that the ethanol permeation flux is high when the $N_2/SF_6$ ratio is 3.0 or more. Therefore, it was found out that, it is more preferable that an aryl group-containing silica membrane filter has a $He/N_2$ ratio of 1.0 to 2.6 or less and an $N_2/SF_6$ ratio of 3.0 to 10.

(Alkyl Group-Containing Silica Membrane Filter)

From the comparison between Examples 9, 11, 12 and Example 13, it was found out that the ethanol permeation flux is high when the $N_2/SF_6$ ratio is 1.5 to 5.0 or more. Therefore, it was found out that, it is more preferable that an alkyl group-containing silica membrane filter has a $He/N_2$ ratio of 1.0 to 2.6 and an $N_2/SF_6$ ratio of 1.5 to 5.0.

INDUSTRIAL APPLICABILITY

The present invention can be used as a silica membrane filter usable for separating or condensing only a specific kind of substances out of a fluid (liquid or gas) where several kinds of substances are mixed together and as a manufacturing method thereof.

DESCRIPTION OF REFERENCE NUMERALS

1: precursor solution, 3: porous substrate, 5: cell, 7: partition wall, 9: inner wall surface, 11: masking tape

The invention claimed is:

1. A silica membrane filter comprising a porous substrate and a silica membrane provided on a surface of the porous substrate,
wherein the ratio of a He gas permeation amount to an $N_2$ gas permeation amount (He gas permeation amount/$N_2$ gas permeation amount) is 1.0 to 2.6, and the ratio of the $N_2$ gas permeation amount to a $SF_6$ gas permeation amount ($N_2$ gas permeation amount/$SF_6$ gas permeation amount) is 1.5 to 10, wherein the measurements of gas permeation amounts are performed at 25° C.

2. The silica membrane filter according to claim 1, wherein the silica membrane contains an aryl group.

3. The silica membrane filter according to claim 2, wherein the aryl group of the silica membrane is one of a phenyl group, a benzyl group, a tolyl group, and a xylyl group.

4. The silica membrane filter according to claim 3, wherein the ratio of the $N_2$ gas permeation amount to the $SF_6$ gas permeation amount ($N_2$ gas permeation amount/$SF_6$ gas permeation amount) is 3.0 to 10.

5. The silica membrane filter according to claim 1, wherein the silica membrane contains an alkyl group.

6. The silica membrane filter according to claim 5, wherein the alkyl group has a carbon number of 2 to 8.

7. The silica membrane filter according to claim 6, wherein the ratio of the $N_2$ gas permeation amount to the $SF_6$ gas permeation amount ($N_2$ gas permeation amount/$SF_6$ gas permeation amount) is 1.5 to 5.0.

8. The silica membrane filter according to claim 1, obtained by subjecting a precursor sol made of a silica raw material containing a silica compound containing an aryl group and/or an alkyl group to a thermal treatment.

9. The silica membrane filter according to claim 8, wherein the silica compound contains an alkoxysilane containing an aryl group and/or an alkyl group.

10. The silica membrane filter according to claim 8, wherein a part of the aryl group and/or the alkyl group derived from the silica compound is decomposed by the thermal treatment.

11. The silica membrane filter according to claim 10, wherein 40 to 99% of the aryl group and/or the alkyl group derived from the silica compound is decomposed.

12. The silica membrane filter according to claim 1, wherein the $N_2$ gas permeation amount is $5.0 \times 10^{-9}$ mol/m²·Pa·s or more.

* * * * *

UNITED STATES PATENT AND TRADEMARK OFFICE
CERTIFICATE OF CORRECTION

PATENT NO. : 8,764,889 B2
APPLICATION NO. : 13/727974
DATED : July 1, 2014
INVENTOR(S) : Mariko Takagi et al.

It is certified that error appears in the above-identified patent and that said Letters Patent is hereby corrected as shown below:

Title Page Item (56) under Other Publications (page 2) column 1, line 1,

Please change: "Y. Oshima, et al., *"New Pore Size Con a SiO$_2$ Membrane,"* Key Engineering Materials, vols. 159-160, pp. 275-280." to -- Y. Oshima, et al., *"New Pore Size Control of a SiO$_2$ Membrane,"* Key Engineering Materials, vols. 159-160, pp. 275-280. --

Signed and Sealed this
Seventh Day of October, 2014

Michelle K. Lee
*Deputy Director of the United States Patent and Trademark Office*